United States Patent Office 2,825,640
Patented Mar. 4, 1958

2,825,640
METHOD OF DEFOLIATING PLANTS

Richard D. Northcraft, Brandywine Hundred, Del., assignor to E. I. du Pont de Nemours and Company, Wilmington, Del., a corporation of Delaware No Drawing. Application July 9, 1953
Serial No. 367,114

7 Claims. (Cl. 71—2.7)

This invention relates to methods and compositions for defoliating plants, and is particularly directed to such methods which comprise applying to the plant a defoliant composition comprising a carboxylic compound of the group consisting of polyenoic acids, polyhalogenated with a halogen from the group consisting of chlorine and bromine, and containing at least 5 carbon atoms, and salts, esters, and amides of said acids, and is further directed to defoliant compositions comprising such carboxylic compounds dispersed in a non-solvent diluent. Polyenoic acids will be understood to include carboxylic acids with more than one ethylenic carbon-to-carbon linkage.

According to recently developed techniques for handling growing plants it is often advantageous to defoliate the plants. For example, in the growing of cotton plants, defoliation of the plant at the time the bolls are ripening and ready to open not only permits access of the sun to dry the bolls on the lower part of the plant but also permits more efficient picking of the bolls either by hand or by machine, prevents staining of the cotton from leaves crushed during picking, and deprives the bollweevil and cotton aphids of their food supply so that the defoliant process reduces the number of these pests which survive to cause damage in the following year.

Similarly other crops may be defoliated to advantage, for example soy beans, tomatoes, castor beans and ramie.

It is necessary, in the use of defoliants, to cause the leaves of the plant to drop while they are still living. With many of the materials heretofore proposed as defoliants the leaves are killed abruptly and dry so rapidly that they harden and "freeze" onto the stems, and hence do not drop off as desired. The compositions of the present invention are defoliants in that they cause leaf drop because they injure but do not abruptly kill the leaves.

It has also hitherto been proposed to use certain materials which in very narrow critical ranges are capable of causing the desired abscission, but such critical control is often difficult to maintain during practical conditions of use. In the methods and compositions of this invention the control of concentration is not so critical as to preclude application of the defoliant by means ordinarily available in the field.

Now, according to the present invention the above mentioned advantages are achieved by employing as a defoliant a composition comprising a carboxylic compound of the group consisting of polyenoic acids, polyhalogenated with a halogen from the group consisting of chlorine and bromine, and containing at least 5 carbon atoms, and salts, esters, and amides of said acids.

Representative of the polyenoic compounds which can be employed according to the present invention is pentachloro-2,4-pentadienoic acid, and its salts. This acid can be prepared by methods known in the art, such as by dehydrochlorination of 2,3,3,4,5,5-hexachloro-4-pentenoic acid, and indeed may be even formed in situ by spontaneous dehydrochlorination of the monoenoic compound in the defoliant composition or after actual application to the plant.

Other representative compounds of this class include, for instance, halogenated dienoic acids with ethylenic bonds conjugated with the carbonyl group; and their $Na^+$, $K^+$, $NH_4^+$, $Ca^{++}$ salts, their methyl-, ethyl-, propyl-, and butyl esters, and their amide:

2,3,4,5,5-pentachloro-2,4-pentadienoic acid
2,3,4,5,5-pentabromo-2,4-pentadienoic acid
3,4,5-trichloro-2,4-pentadienoic acid
2,3,4,5-tetrachloro-2,4-pentadienoic acid
3,4,5,5-tetrachloro-2,4-hexadienoic acid
2,3,5,6-tetrachloro-4-chloromethyl-2,4-hexadienoic acid
2,3,4,6-tetrachloro-2,4-hexadienoic acid
2,3,5,5-tetrachloro-2,4-pentadienoic acid
2,3,4-trichloro-2,4-pentadienoic acid
2,3,6,6-tetrachloro-2,4-hexadienoic acid
2,3,4,5,6,6,7-heptachloro-2,4-heptadienoic acid
2,4,5,5-tetrachloro-2,4-pentadienoic acid
2,5,5-trichloro-2,4-pentadienoic acid
2,3,5,6-tetrachloro-2,4-hexadienoic acid
2,3,4,5,6-pentachloro-2,4-hexadienoic acid
2,4,5-trichloro-2,4-pentadienoic acid
2,3,5-trichloro-2,4-pentadienoic acid
2,4,5,6-tetrachloro-2,4-hexadienoic acid
2,4,5,5-tetrachloro-2,4-pentadienoic acid
4,5,5-trichloro-2,4-pentadienoic acid
2,3,4,5-tetrachloro-2,4-hexadienoic acid Halogenated dienoic acids with conjugated ethylenic bonds but not conjugated with the carbonyl group; and their $Na^+$, $K^+$, $NH_4^+$, $Ca^{++}$ salts, their methyl-, ethyl-, propyl-, and butyl-ester, and their amide are also included:

4,5,6,6-tetrachloro-3,5-hexadienoic acid
2,2,6,6-tetrachloro-3,5-hexadienoic acid
2,2,3,6-tetrachloro-3,5-hexadienoic acid
2,2,3,4,5,6-hexachloro-3,5-hexadienoic acid
2,2,3,4,5,6,7-heptachloro-3,5-heptadienoic acid
2,2,3,3,4,5,6,7,7-monochloro-4,6-heptadienoic acid
4,5,6,7,7-pentachloro-4,6-heptadienoic acid Unsaturated halogenated acids with more than two ethylenic bonds which are conjugated with the carbonyl group; and their $Na^+$, $K^+$, $NH_4^+$, $Ca^{++}$ salts, their methyl-, ethyl-, propyl-, and butyl-esters, and their amide are also included in this class:

2,3,4,5,6,7-hexachloro-2,4,6-heptatrienoic acid
2,3,4,5,6,7,8,9,10,11 - decachloro - 2,4,6,8,10 - undeca- (pentaenoic) acid
2,3,4,5,6,7,7-heptachloro-2,4,6-heptatrienoic acid
2,3,4,5,6,7,7-heptabromo-2,4,6-heptatrienoic acid The carboxylic compound contains at least 5 carbon atoms and preferably contains from 5 to 12 carbon atoms. However, it will be understood that it is the carboxylic acid portion of the compound which contains this number of carbon atoms and that in the case of derivatives such as the esters, the carbon atoms added to the acid by the esterification are not counted in the total number of carbon atoms.

In a preferred species, the polyenoic compound is conjugated.

While the carboxylic compound is polyhalogenated, it is not required that it be completely halogenated—that is, that all replaceable hydrogens shall have been replaced with chlorine or bromine. It is sufficient that there be a plurality of chlorine or bromine substituents on the carboxylic acid portion of the compound.

It will be further understood that the number of carbon atoms has reference to the number of carboxyl groups or carboxyl derivatives present. Thus, the carboxylic compound contains from 5 to 12 carbon atoms per carboxylic group or carboxylic derivative. By "carboxylic derivative" is meant the salts, esters, and amides in accordance with usual practice.

The concentration of the defoliant to use in defoliating a plant depends on many factors, such as the moisture already present in the plant the rapidity with which defoliation is desired, the maturity of the plant, and similar considerations. Under a given set of conditions it is found that the defoliant compositions of the present invention permit a greater variation in concentration than is the case with many of the defoliant materials heretofore employed.

The defoliant compositions of the present invention contain a carboxylic compound as described above, dispersed in a non-solvent diluent. Such compositions represent an advantageous form in which the carboxylic compounds can be used to defoliate plants in accordance with processes herein described. The dispersions can be in a dry form, such as dusts containing a relatively small proportion of the carboxylic compound and a major proportion of a diluent such as talc, pyrophyllite, natural clay, diatomaceous earths and other powdered diluents such as are mentioned in United States Patent 2,426,417. The dispersions can be in liquid form and will thus be emulsions of the carboxylic compounds in a liquid which is not a solvent for the compounds. The dispersions can contain wetting, dispersing and emulsifying agents such as those referred to in United States Patent 2,426,417. Other wetting, dispersing, and emulsifying agents such as those listed in detail in Bulletin E607 of the Bureau of Entomology and Plant Quarantine of the U. S. Department of Agriculture and those set out in the book by McCutcheon entitled Synthetic Detergents (McNair-Duorland, 1950) can also be used.

It will be understood that certain of the carboxylic compounds can be applied in the form of aqueous solutions according to the processes of the invention for defoliating plants. The salts of the carboxylic compounds with such bases as sodium hydroxide, potassium hydroxide, ammonium hydroxide, or alkyl quaternary ammonium hydroxide can be used in the processes.

To secure homogeneous dispersions in non-solvent liquids diluents, a surface-active agent of the wetting, dispersing, or emulsifying type is used. In fact, preferred defoliant formulations of the invention, whether in liquid or solid form, contain the active ingredient homogeneously admixed with such a surface-activation. Generally, the wetting, dispersing, or emulsifying agent will not comprise more than 5 to 15 percent by weight of the formulation, and with the more effective surface-active adjuvant materials the percentage will be 5 percent or less. Usually the minimum lower concentration will be 0.1 percent.

The defoliant compositions are applied either as a spray or a dust to the foliage to be removed. The use of a non-solvent diluent permits a reasonably uniform distribution of an effective amount of active ingredient even when such methods as dusting or spraying from an airplane are employed.

The carboxylic compounds are effective even at low rates of application. The compositions have been found to be effective, given practically 100 percent defoliation, when used in rates of 10 pounds per acre. Under ideal conditions, lesser amounts, say down to 1 pound per acre, can be used but in general an application of from about 2 to 20 pounds per acre of the active ingredient is preferred for cotton plants.

The invention will be better understood by reference to the following illustrative examples:

Example 1

Three series of six 30 day-old cotton cotyledons were sprayed with a 0.1, 0.5 and 1.0 percent acetone solution of pentachloro-2,4-pentadienoic acid using an atomizer at 5 pounds pressure. At 0.1 percent, 6 out of 6 cotyledon defoliated, at 0.5 percent 3 out of 6, and at 1.0 percent, 2 out of 6 defoliated. Kill of cotyledons occurred at the higher percentages.

Example 2

Three pots of 2 mature (120-day old) plants per pot were sprayed with a 1 percent acetone solution of pentachloro-2,4-pentadienoic acid with an atomizer at 5 pounds pressure. Results showed 95 percent defoliation.

Example 3

Four cotton cotyledons on 30-day old cotton plants were sprayed with 0.1, 0.5 and 1.0 percent concentrations of 2,3,4,5,5-pentachloro-2,4-pentadienoic acid, Na+ salt aqueous solution using an atomizer at 5 pounds pressure. Results showed that 0.1 percent 4 out of 4 cotyledons were defoliated, 4 out of 4 at 0.5 percent and 3 out of 4 at 1 percent.

Example 4

A 1 percent water solution of 2,3,4,5,5 pentachloro-2,4-pentadienoic acid, sodium salt, was sprayed on cotton plants about 120 days old with an atomizer at 5 pounds pressure. Results of two replications showed 38 out of 41 leaves defoliated or 93 percent defoliation.

I claim:
1. A method of defoliating a plant which comprises applying to the plant, in a defoliating amount, a defoliant composition comprising an aliphatic carboxylic compound of the group consisting of polyenoic acids, polyhalogenated with halogen from the group consisting of chlorine and bromine and containing from 5 to 12 carbon atoms, and salts, esters, and amides of said acids.
2. A method of defoliating a plant which comprises applying to the plant, in a defoliating amount, a defoliant composition comprising a dispersion of an aliphatic carboxylic compound of the group consisting of polyenoic acids, polyhalogenated with halogen from the group consisting of chlorine and bromine and containing from 5 to 12 carbon atoms, and salts, esters, and amides of said acids, in a non-solvent diluent.
3. A method of defoliating a plant which comprises applying to the plant, in a defoliating amount, a defoliant composition comprising a solution of an aliphatic carboxylic compound of the group consisting of polyenoic acids, polyhalogenated with halogen from the group consisting of chlorine and bromine and containing from 5 to 12 carbon atoms, and salts, esters, and amides of said acids.
4. A method of defoliating a plant which comprises applying to the plant, in a defoliating amount, a defoliant composition comprising pentachloropentadienoic acid.
5. A method of defoliating a plant which comprises applying to the plant, in a defoliating amount, a defoliant composition comprising a pentachloropentadienoic acid salt.
6. A method of defoliating a plant which comprises applying to the plant, in a defoliating amount, a defoliant composition comprising an aqueous solution of a salt of an aliphatic, carboxylic polyenoic acid, polyhalogenated with halogen from the group consisting of chlorine and bromine and containing from 5 to 12 carbon atoms.
7. A method of defoliating a plant which comprises applying to the plant, in a defoliating amount, a defoliant composition comprising an aqueous solution of a pentachloropentadienoic acid salt.

References Cited in the file of this patent

UNITED STATES PATENTS

| | | |
|---|---|---|
| 2,393,086 | Bousquet | Jan. 15, 1946 |
| 2,430,332 | Guy et al. | Nov. 4, 1947 |
| 2,618,545 | Newcomer | Nov. 18, 1952 |
| 2,668,758 | Roos et al. | Feb. 9, 1954 |

OTHER REFERENCES

Chemical Abstracts, published by The American Chemical Society, vol. 43 (1949), column 4230(h).
Beilstein's "Handbuch der Organischen Chemie," Fourth Ed. (1920), vol. II, page 482.
Chemical Abstracts, vol. 44 (1950), page 1916(d).